No. 647,970. Patented Apr. 24, 1900.
M. KALLMANN.
APPARATUS FOR INDICATING LEAKAGE OF CURRENT FROM ELECTRIC CONDUCTORS.
(Application filed Dec. 27, 1898.)
(No Model.)
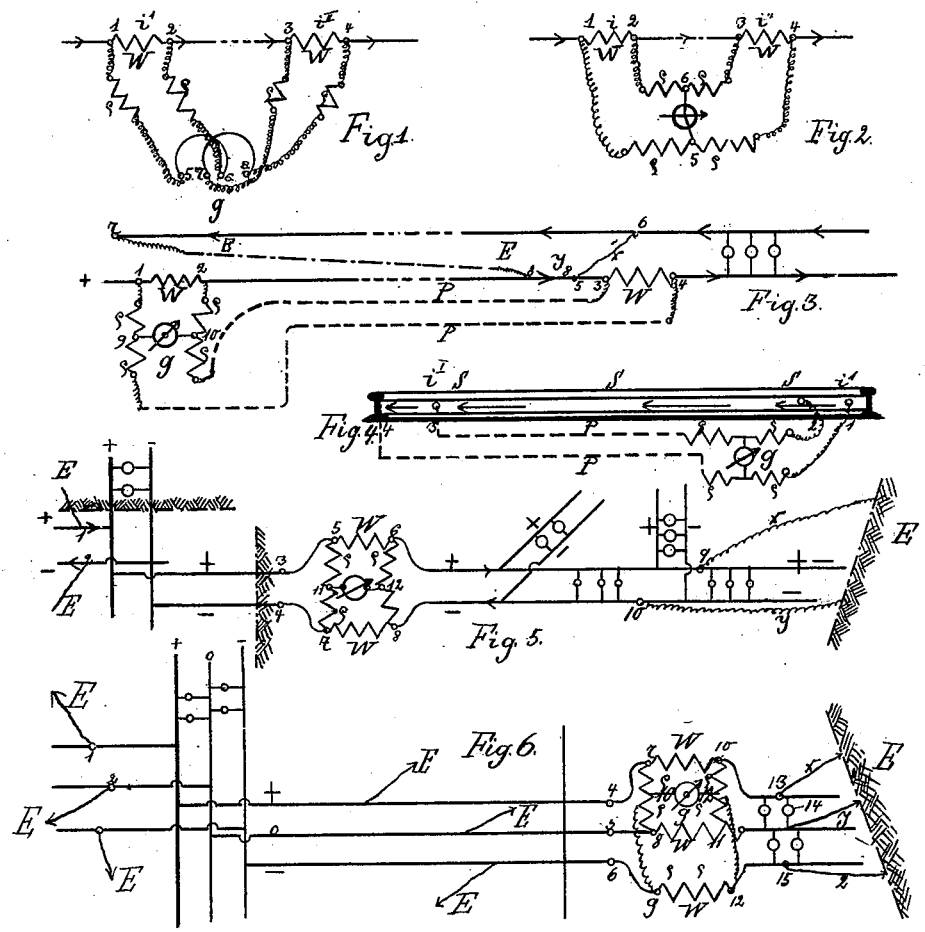
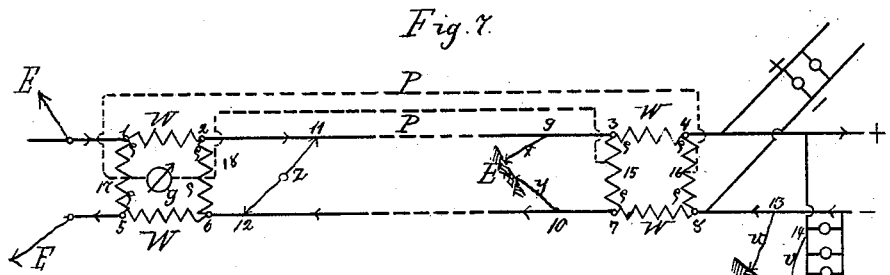
Witnesses: Inventor: Martin Kallmann
By Richard... his Attorneys

UNITED STATES PATENT OFFICE.

MARTIN KALLMANN, OF BERLIN, GERMANY.

APPARATUS FOR INDICATING LEAKAGE OF CURRENT FROM ELECTRIC CONDUCTORS.

SPECIFICATION forming part of Letters Patent No. 647,970, dated April 24, 1900.

Application filed December 27, 1898. Serial No. 700,406. (No model.)

*To all whom it may concern:*

Be it known that I, MARTIN KALLMANN, electrical engineer, of 69 Königgrätzerstrasse, Berlin, W., in the Empire of Germany, have invented certain new and useful Improvements in Apparatus for Indicating Leakage or Escapes of Current from Electric Conductors, of which the following is a full, clear, and exact specification.

The present invention has for its object to provide a control or check, as direct as possible, on electrical conductors carrying large quantities of current with respect to any leakages of current without interrupting the working current. The method which is enabled to be carried out by the new apparatus is based on a measurement of the differences of current strengths flowing through conductors between various points of said conductors by the employment of a differential method and preferably of the measure of the so-called "double-bridge" arrangement. The method is general for controlling single conductors, and it is immaterial whether said conductors are carried underground or overground, or consist of wholly or slightly insulated wires, cables, &c., or whether it is applied to entire installation or to the rails serving for the return-current lead of electric railways. In this apparatus there is a characteristic feature—namely, that it is possible to control the insulation value of conductors that are traversed by current without comparing the potential of the earth or the earth-current at the fault itself and without said measurement being in general interfered with by other faults that may exist at other places of the installation.

Figures 1 and 2 illustrate the differential system upon which the method is based, while Fig. 3 illustrates the practical application of the same to the case of a single conductor. Fig. 4 illustrates its application to the current-return rail of electric railways, and Fig. 5 its application for controlling the insulation of an entire house installation on the two-wire system. Fig. 6 illustrates the same installation for a three-wire system, and Fig. 7 illustrates its application for controlling at the same time long-distance conductors and installations.

Whereas the so-called "zero methods" of measurements have hitherto served only for determining resistance values with equal current strengths in the resistance to be measured, there are employed in the improved apparatus analogous methods for determining small differences of current strengths in resistance which are otherwise of equal value or which are in a constant ratio to each other.

In Fig. 1, 1 2 illustrate a resistance $w$, which is traversed by a current $i'$ of any desired strength, and 3 4 illustrate, for example, a resistance $w$ of equal value, but which is traversed by a somewhat-different current strength $i''$. Then if a differential galvanometer $g$ be connected with one winding 5 6 (with interposition of the rheostats $\rho$ 1 5 and 2 6) to the points 1 and 2 and with its other winding 7 8 to the points 3 and 4 (also with the interposition of $\rho$ 3 8 and 4 7) this galvanometer will indicate the difference of the current strengths $i'$ $i''$ obtaining in the branch resistances 1 2 and 3 4. If then this difference of current be produced by a leakage or other fault, &c., existing between the two points of measurement, then the deflection of $g$ will correspond directly to the escape of current that has taken place.

Analogous, but practically more convenient, is the employment of the double-bridge connection for this general case, Fig. 2, in which the galvanometer $g$, which is connected to the points 5 and 6, need only have a single winding—for example, a millivoltmeter or the like. Resistances in the wire connections, as also transitional resistances, are eliminated by the interposition of the rheostats $\rho$ 1 5, 2 6, 4 5, and 3 6.

If $g$ gives no deflection, that proves the equality of $i'$ $i''$. Consequently no loss or escape of current has taken place along the path from 2 3. In this case the points 5 and 6 show equal potential. According as $i'$ is greater or smaller than $i''$ a deflection will take place in the galvanoscope to one side or to the other. Instead of utilizing this deflection directly as the measure of the escape of current or of the insulation fault the zero method may be further employed by making the deflection equal to zero by varying the ratio of the rheostats or of the branch resistances $w$—that is to say, by depriving the galvanoscope $g$ of current and then using the regulation of the resistance thus effected as the measure of the escape of current which has taken place.

Instead of making the resistances $w$, as also the rheostats, equally great one to the other they may be also brought into any desired ratio to one another, and then for determining the indications of $g$ the well-known proportional formula may be employed. In the further description for the sake of simplicity only the case of equal resistances in the double bridges will be assumed. For the purpose of obviating too-fine adjustment of the galvanometer resistances and rheostats the zero adjustment of the galvanometer may also be conveniently regulated by means of regulating resistances before inserting the apparatus in the working-current circuit.

The above-described differential system of measurement may be employed quite generally in almost all cases that occur in electrical working where it is desired to ascertain earth connections or other escape of current by leakage or for the purpose of permanently controlling the insulation or for discovering any wandering currents of electrical railways, &c. The indications of the galvanometer correspond to the amount of the current strengths that have escaped, the arrangement being such that the measurement (as it is a question of the difference of two current conditions) is independent of the obtaining working-current conditions—that is to say, the load—and since the earth-potential does not come in question in this method in contradistinction to the otherwise usually employed methods of determining insulation this method is not influenced by any variation of the earth-potential or by other earth-currents of any other earth connections.

Fig. 3 illustrates a case in which it is desired to observe the insulation of a single conductor—for example, a long-distance conductor. At the commencement of the conductor—for example, at the central station—there is inserted at 1 2 a small strong current resistance $w$ and a similar resistance $w$ at the end of the conductor at 3 4. The difference in potential obtaining at the terminal points 3 and 4 of the latter resistance $w$ can be measured by means of the testing-wires P, which are carried back to the station. This difference of potential divided by the resistance $w$ would give the strength of the working current which flows through $w$, (3 4.) The current strength obtaining in $w$ (1 2) would be capable of being observed by means of the measuring-wires connected to 3 and 4. The measuring-wires leading to 1 and 2 and to 3 and 4, respectively, are, as explained in Fig. 2, connected (with the interposition of the rheostats) to the galvanometer $g$ (millivoltmeter or the like) at 9 10, and then the deflection which takes place at $g$ will correspond to the difference of current strength in the conductor at 1 2 as compared with 3 4—that is to say, since no current is taken off along the path 2 3 the deflection will correspond to the amount of the escape of the current which has taken place by leakages—for example, at faults at 5 and 6. Thus the deflection of the galvanometer indicates directly the amount of the current leakage through the insulation faults at 5 and 8 independently of any other earth connections in the system—for example, at the point 7.

The determination of the earth-currents (so-called "wandering currents") escaping from the track-rails S of electrical railways, Fig. 4, is effected in a similar manner. In this case a definitely-limited length of track-line—for example, equal lengths of 1 2 and 3 4—replaces the branch resistances $w$ in the former cases. If $i'$ represents the working-current strength flowing in the rail-length 1 2 and $i''$ the strength of the working current flowing in the rail portion 3 4, then $i'$ $i''$ will represent the amount of the wandering current which has escaped along the path 2 3 from the rails into the ground, pipes, &c., and which is now directly indicated by the galvanometers $g$, which are connected by measuring-wires P P to the points 1 and 2 and 3 and 4, respectively, in each case with interposition of $\rho$.

If the critical lengths of track which show or in which it is thought that there exist considerable amounts of current losses by escape be connected in the manner above described by means of insulated measuring-wires permanently to a differential bridge of the kind described that is provided at a suitable point, then a permanent control of the earth-currents can be obtained during the working of the railway, the arrangement being such that the difference of potential between 1 and 2, as also the difference between 2 and 4, will each give (after having been previously measured or gaged once for all) the strength of the current flowing in the track-rails.

Fig. 5 shows the application of the method to a two-conductor installation. In this case the apparatus would be advantageously included in the two conductors close to the house connection 3 4. The branch resistances $w$—for example, each of one ohm—may, if desired, be normally short-circuited or bridged over and are only traversed by current at the instant of measurement, so as to obviate unnecessary permanent losses of potential. The earth-currents which escape at 9 and 10 in consequence of insulation faults or the like produce a difference between the current flowing in $w$ (5 6) and in $w$, (7 8,) so that this difference of current in the forward and return leads, which is measured by the galvanometer $g$ in the manner above described, corresponds to the insulation fault of the installation.

Fig. 6 illustrates the use of this method for installations on the three-wire system. In this case a resistance $w$ is included in each of the three poles. To each of these three resistances $w$ the galvanometer $g$ is connected, with the interposition of rheostats at 7 and 10 to the $+=$ pole, at 8 and 11 to the $0=$ pole, and at 9 and 12 to the $-=$ pole. Consequently the galvanometer measures the difference between the current difference between the plus and the minus pole $(i+i-)$ as compared with the current $i^0$ in the neutral conductor—that is to say, the difference of load of the long-distance conductors corresponding to the current escape at 13, 14, and 15. If one of the halves of the system is without current, then in general there will be obtained the case of Fig. 5—namely, that of the two-wire system with a slight modification.

Finally, Fig. 7 illustrates a combination of Figs. 3 and 5. In this case, Fig. 7, the current loss by leakages at 9 10 11 12 on the long-distance conductors and in the installation at 13 and 14 is shown on the galvanometer. In this case the four resistances $w$ (which are equal to each other) are included at 1 2 and 5 6 at the commencement and at 3 4 and 7 8 at the end of the line conductors. The current loss in the installation through the faults $u$ and $v$ is shown by the difference of potential at the points 15 16 (between the rheostats $\rho$) at the end of the line conductor, (beginning of the installation.) These points 15 16 are connected by means of the testing-wires P P to the galvanometer $g$, situated at the station, and which galvanometer is also connected to the points 17 18 (also between rheostats $\rho$) at the commencement of the line conductors. The galvanometer $g$ thus measures when it is only connected to 15 16 the whole of the current escapes at $x\ y\ z$ on the line and at $u\ v$ in the installation. If $g$ is only connected at 17 18 by means of the testing-wires P P, then it measures only the earth connections $u\ v$ of the installation; but if $g$ is connected simultaneously to 17 and 18 and to 15 and 16 it indicates the difference of the two values—that is to say, only the current losses that occur in the line at $x\ y\ z$. The application of this case to a three-wire system would be carried out in an analogous manner.

In indicating insulation faults of the two poles of an installation of the kind shown in Figs. 5, 6, and 7 the simultaneous occurrence of further earth connections in the system constitutes the presumption for the use of the differential measuring system above described, because the current which escapes, for example, from the earth-line flows back through the earth into a place of earth connection of the other pole in the system to the return-pole—that is to say, without making use of the return-conductor of the installation-wires. This presumption of the presence of other considerable earth connections is generally correct in the case of networks of conductors; but otherwise—for example, for the purpose of measurement—one pole should be placed at the entrance of the installation to the machine or in the network directly or—for example, with interposition of a lamp—to earth for the purpose of allowing the current leakage of the installation to use this direct earth-path, which forms the preliminary condition for the existence of a difference between the current strength of the forward and return paths, and consequently for the differential method. When the insulation resistance of the two poles is equal, the galvanometer at first gives no deflection, and it is therefore necessary to make a second measurement with a known central resistance or by momentarily interrupting one pole, whereby a direct indication is received in this case also.

From the foregoing statements it will be seen that the system of differential-current measurements indicates directly the escapes of current by reason of leakages or faults of any kind or position during the working independently of the existing load on a conductor in the installation and without being affected by other earth connections, earth-currents, &c., and by the use of a contact device on the sufficiently-sensitive galvanometer which is to be used (millivoltmeter of highest possible resistance) it also indicates the escape of current automatically.

I claim—

1. In combination with an electrical conductor, a galvanometer, electrical connections therefrom to four different points upon said conductor, and resistances in said connections.

2. In combination, with an electrical conductor having resistances at different points, a galvanometer, electrical connections from said galvanometer to points on each side of each resistance, and resistances in said connections, substantially as described.

3. In combination with an electrical conductor, having resistances at different points, a differential galvanometer having one winding electrically connected with said conductor at points on each side of the first resistance, and its other winding electrically connected with the conductor on opposite sides of the second resistance, with rheostats in said electrical connections, substantially as described.

In testimony that I claim the foregoing as my invention I have signed my name in presence of two subscribing witnesses.

MARTIN KALLMANN.

Witnesses:
WOLDEMAR HAUPT,
HENRY HASPER.